(12) United States Patent
Relan

(10) Patent No.: US 7,788,778 B2
(45) Date of Patent: Sep. 7, 2010

(54) APPARATUS AND METHOD OF ASSEMBLING A PISTON ON A SHAFT OVER A LIP SEAL

(75) Inventor: Krishna K. Relan, Canton, MI (US)

(73) Assignee: GM Global Technology Operations, inc., Detroit, MI (US)

( * ) Notice: Subject to any disclaimer, the term of this patent is extended or adjusted under 35 U.S.C. 154(b) by 408 days.

(21) Appl. No.: 11/695,208

(22) Filed: Apr. 2, 2007

(65) Prior Publication Data

US 2008/0235931 A1  Oct. 2, 2008

(51) Int. Cl.
*B23P 11/00* (2006.01)
(52) U.S. Cl. ............................. 29/235; 29/255
(58) Field of Classification Search ............... 29/281.1, 29/255, 257, 263, 278
See application file for complete search history.

(56) References Cited

U.S. PATENT DOCUMENTS

| 5,887,328 | A | * | 3/1999 | Rydin et al. | 29/259 |
| 6,012,209 | A | * | 1/2000 | Whetstone | 29/235 |
| 6,148,493 | A | * | 11/2000 | Pixley et al. | 29/275 |
| 6,360,415 | B1 | * | 3/2002 | Wada et al. | 29/283.5 |
| 6,886,227 | B1 | * | 5/2005 | Hedrick | 29/252 |
| 7,478,464 | B2 | * | 1/2009 | Kang | 29/255 |
| 2008/0235931 | A1 | * | 10/2008 | Relan | 29/428 |

* cited by examiner

*Primary Examiner*—Lee D Wilson

(57) ABSTRACT

A method and apparatus for installing a piston over a lip seal on a shaft includes a cylinder or primary force and a weight member or secondary force. The primary force and secondary force are coupled by a resilient member, which will permit the secondary force to retract from the assembly process when the force needed to complete the assembly is above a predetermined value.

5 Claims, 3 Drawing Sheets

APPARATUS AND METHOD OF ASSEMBLING A PISTON ON A SHAFT OVER A LIP SEAL

TECHNICAL FIELD

This invention relates to fluid-operated pistons and, more particularly, to a method for mounting the piston on a shaft over a lip seal.

BACKGROUND OF THE INVENTION

Many automatic transmissions have fluid-operated clutches which have the inner surface thereof slidingly sealed by a lip type seal. The lip seal is installed in a groove formed in a shaft member and the piston is installed over the seal. During installation, it has been found that under certain circumstances, the lip seal will tend to roll and therefore be ineffective as a sealing member in the transmission.

Generally, this error is discovered during testing of the transmission and/or clutch pistons prior to removal from the plant installation into an automobile. However, under some instances, the lip seal is partially rolled and the leakage is slow, such that the error is not found until after the vehicle has been in operation for a while.

SUMMARY OF THE INVENTION

It is an object of the present invention to provide an improved method of installing equipment over a lip seal on a shaft member.

In one aspect of the present invention, the lip seal is installed in a groove in the shaft and the piston is forced over this lip seal and onto the shaft by a piston and weight.

In another aspect of the present invention, the piston is operable on the weight through a spring member.

In yet another aspect of the present invention, the weight member is operable on the piston through a plurality of rods.

In still another aspect of the present invention, if the installation force of the piston over the lip seal exceeds a predetermined value, the weight is forced against the direction of motion of the piston to indicate the ineffective installation thereof.

DESCRIPTION OF AN EXEMPLARY EMBODIMENT

Figure 1:
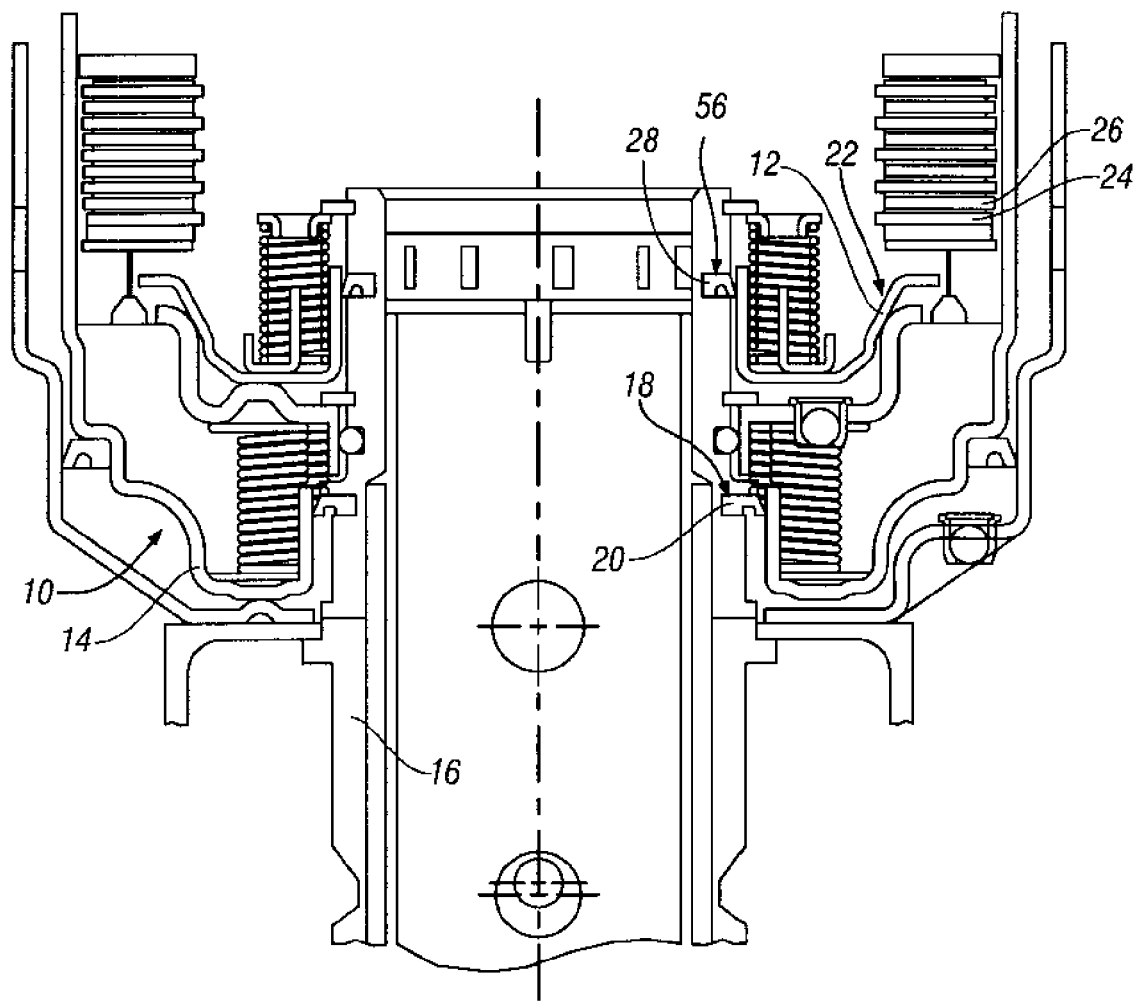
FIG. 1 is an elevational view describing a portion of a transmission assembly.
Figure 2:
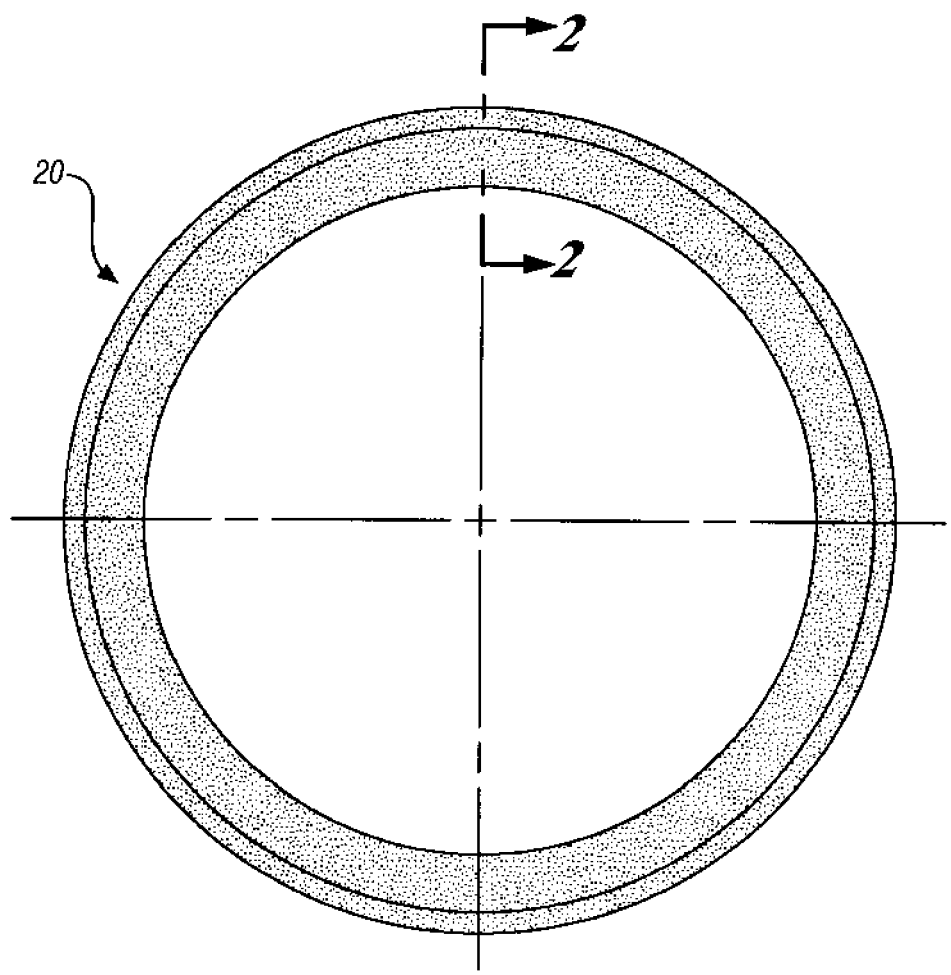
FIG. 2 is an elevational view of a lip seal.
Figure 3:
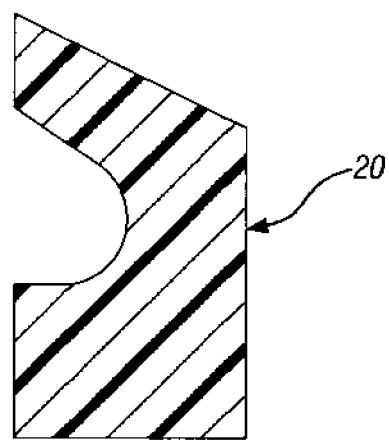
FIG. 3 is a view taken along line 2-2 of FIG. 2.

Power transmissions often employ fluid-operated clutches, such as 10 and 12, shown in FIG. 1. The fluid clutch 10 includes a piston 14, which is slidably disposed on a shaft 16. The shaft 16 has formed therein a groove 18 in which is positioned a lip seal 20, such as that shown in FIGS. 2 and 3. The clutch 12 also includes a piston 22 and a plurality of friction plates or discs 24 and 26. The piston 22 is slidably disposed on the shaft 16 and is sealed at the inner surface thereof by a lip seal 28, which is similar to the lip seal 20. As can be seen in the drawing, the lip seal 28 has a smaller diameter than the lip seal 20.

Figure 4:
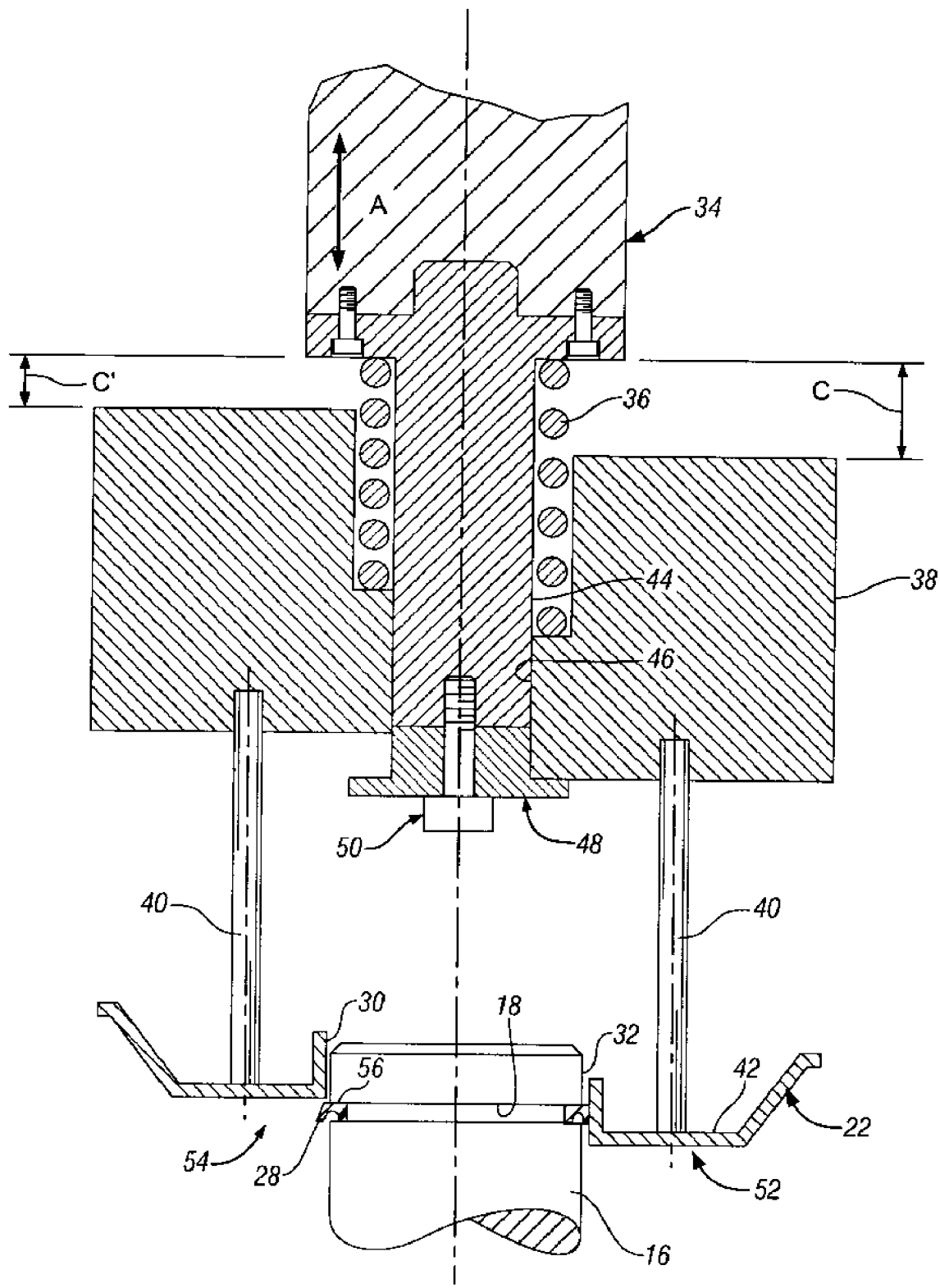
FIG. 4 is a diagrammatic representation of the assembly process for installing the piston over a lip seal.

The piston 22 is installed over the shaft 16, as shown in FIG. 4. This installation occurs before the shaft and piston assembly are placed inside the transmission or before the completion of the clutch assembly. The piston 22 has an inner circumference or opening 30, which is larger than outer diameter 32 of the shaft 16.

An air or hydraulic cylinder 34 is employed to impose a force on the piston during assembly. The cylinder 34 operates through a spring 36, which in turn presents a force to a weight member 38. The weight 38 has a plurality of pins 40 associated therewith. The pins 40 abut an annular surface 42 of the piston 22. The cylinder 34 has an extension 44, which passes through an opening 46 in the weight 38 and is positioned thereon by a spacer 48 and a screw or threaded fastener 50.

During assembly of the piston 22 over the lip seal 28, the cylinder 34 is moved in the direction of Arrow A thereby imposing a force through the spring 36 on the weight 38. The weight itself also imposes a force and the addition of these forces urge the piston 22 to pass over the lip seal 28, as shown on the right side 52 of FIG. 4. However, if the lip seal 28 has a larger resistance force, for example if it rolls out of the groove 56, the force required to move the piston across the seal 28 increases.

As seen on the left side 54 of FIG. 4, this increased force is large enough to cause the weight 38 to move upward relative to the cylinder 34 such that the weight 38 will separate from the spacer 48 and a gap C' between the weight 38 and the cylinder 34 is decreased from the normal value of the gap C. This reduction in the gap C is a visual indication that the lip seal is not properly installed and correction can be made immediately. Alternatively, the position of the weight 38 can be determined by conventional electronic sensors, which will supply a signal to the operator that the piston 22 has not been properly installed.

The spring 36 has a stored force which determines the minimum force at which the weight 38 will begin to reduce the gap C to the gap C'. By determining the force, which is normally required to insert the piston over the seal 28, the spring 36 can be properly designed. Thus, the assemblies would be conducted with a machine in which the load on the spring is either variable or it can be performed on separate machines.

The method of installing the piston comprises imposing a force to the piston from the cylinder 34 through the spring 36 and the weight 38. If the force necessary to install the piston over a seal exceeds the weight 38, the spring 36 will permit the weight to remain stationary and a gap between the cylinder and the weight will decrease signaling that the seal is not properly installed

The invention claimed is:

1. A device for positioning a piston on a shaft, wherein the shaft includes a groove that houses a lip seal, and wherein an installation force is required to position the piston overtop the lip seal when the lip seal is properly positioned, the device comprising:

a cylinder moveable between a plurality of positions to exert a first force;

a weight member in contact with the piston and having an annular portion circumscribing the cylinder, wherein a plurality of pins are attached to the annular portion, and wherein the plurality of pins transfer a total force to the piston; and a spring disposed between the cylinder and the weight member, wherein the spring includes a first end in contact with the cylinder and a second end in contact with the weight member, wherein the spring is operable to transmit the first force from the cylinder to the weight member, wherein if the total force does not exceed the installation force then the spring does not compress greater than a first distance indicative of a properly positioned lip seal, and wherein if the total force does exceed the predetermined installation force then the spring does compress greater than the first distance, indicative of an improperly positioned lip seal.

2. The device of claim 1, wherein the total force includes the first force and a weight force from the weight member.

3. The device of claim 1, wherein the spring is a coil spring.

4. The device of claim 1, wherein the cylinder is a hydraulic cylinder.

5. The device of claim 1, wherein the first distance is the same as an initial distance between the weight member and the cylinder.

* * * * *